United States Patent
Jeong

(10) Patent No.: US 11,577,714 B2
(45) Date of Patent: Feb. 14, 2023

(54) METHOD AND APPARATUS FOR CONTROLLING TERRAIN DRIVING MODE OF HYBRID VEHICLE

(71) Applicants: HYUNDAI MOTOR COMPANY, Seoul (KR); KIA MOTORS CORPORATION, Seoul (KR)

(72) Inventor: Seok Min Jeong, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 514 days.

(21) Appl. No.: 16/843,157

(22) Filed: Apr. 8, 2020

(65) Prior Publication Data

US 2021/0179061 A1 Jun. 17, 2021

(30) Foreign Application Priority Data

Dec. 16, 2019 (KR) .................. 10-2019-0167878

(51) Int. Cl.
*B60W 20/10* (2016.01)

(52) U.S. Cl.
CPC ....... *B60W 20/10* (2013.01); *B60W 2510/083* (2013.01); *B60W 2510/244* (2013.01); *B60W 2520/28* (2013.01); *B60W 2552/05* (2020.02); *B60W 2710/083* (2013.01)

(58) Field of Classification Search
CPC ............ B60W 20/10; B60W 2552/05; B60W 2510/083; B60W 2510/244; B60W 2520/28; B60W 2710/083
See application file for complete search history.

(56) References Cited

U.S. PATENT DOCUMENTS

| 2009/0069989 | A1* | 3/2009 | Heap | B60W 20/10 |
| | | | | 701/101 |
| 2009/0111645 | A1* | 4/2009 | Heap | B60K 6/547 |
| | | | | 701/68 |
| 2018/0283267 | A1* | 10/2018 | Xiao | F02D 41/123 |

FOREIGN PATENT DOCUMENTS

JP 5661500 B2 1/2015

* cited by examiner

*Primary Examiner* — George C Jin
(74) *Attorney, Agent, or Firm* — McDonnell Boehnen Hulbert & Berghoff LLP

(57) ABSTRACT

Disclosed herein is a method of controlling a terrain driving mode of a hybrid vehicle, including defining demand torque required for vehicle driving depending on driver demand and an environment of a driving road, differentiating demand torque in response to the terrain driving mode, calculating accumulated driving energy from a time point of an operation in the terrain driving mode based on the differentiated demand torque, and determining a terrain driving method based on the calculated accumulated driving energy and a state of energy (SoE) in consideration of a state of charge (SoC) and a voltage condition of a battery cell.

19 Claims, 5 Drawing Sheets

METHOD AND APPARATUS FOR CONTROLLING TERRAIN DRIVING MODE OF HYBRID VEHICLE

CROSS REFERENCE TO RELATED APPLICATIONS

This application claims the benefit of Korean Patent Application No. 10-2019-0167878, filed on Dec. 16, 2019, which is hereby incorporated by reference as if fully set forth herein.

BACKGROUND

Field

The present disclosure relates to a method and apparatus for controlling a terrain driving mode of a hybrid vehicle.

Discussion of the Related Art

In general, a hybrid electric vehicle (HEV) refers to a vehicle that uses two power sources, in most cases an engine and an electric motor. An HEV has excellent fuel efficiency and engine performance compared with a vehicle including only an internal combustion engine and is also advantageous for lowering exhaust gas, and thus has been actively developed recently.

In such a hybrid vehicle, when the use of an electric motor is increased, the state of charge (SoC) of a battery is lowered and the vehicle enters a battery charging mode for charging the battery when stopped in order to charge the battery. Accordingly, the fuel efficiency of the hybrid vehicle is lowered and the performance of the vehicle is also degraded.

In general, a vehicle has a terrain driving mode for an escape, but a hybrid vehicle has a problem in that, when the vehicle is driven by an engine only to generate driving force for an escape from a hard road, fuel efficiency is degraded, and when the vehicle is driven in a hybrid mode, an SoC of a battery is lowered to degrade driving performance of the vehicle.

SUMMARY

Accordingly, the present disclosure is directed to a method and apparatus for controlling a terrain driving mode of a driving hybrid vehicle for enhancing vehicle fuel efficiency while state of charge (SoC) balancing of an optimum high-voltage battery is maintained when a hybrid vehicle is driven in a hard road escape mode.

The technical problems solved by the embodiments are not limited to the above technical problems and other technical problems which are not described herein will become apparent to those skilled in the art from the following description.

To achieve these objects and other advantages and in accordance with the purpose of the disclosure, as embodied and broadly described herein, a method of controlling a terrain driving mode of a hybrid vehicle includes defining demand torque required for vehicle driving depending on driver demand and an environment of a driving road, differentiating demand torque in response to the terrain driving mode, calculating accumulated driving energy from a time point of an operation in the terrain driving mode based on the differentiated demand torque, and determining a terrain driving method based on the calculated accumulated driving energy and a state of energy (SoE) in consideration of a state of charge (SoC) and a voltage condition of a battery cell.

In some embodiments, the determining the terrain driving method may include defining at least one of a boundary point A based on the SoE or a boundary point A' based on the accumulated driving energy, and determining whether the SoE is less than the boundary point A or the accumulated driving energy is greater than the boundary point A'.

In some embodiments, the defining a reference boundary point of the accumulated driving energy may include defining a boundary point based on the accumulated driving energy in consideration of at least one of road environment, a driving habit, or battery charge and discharge characteristics. In some embodiments, the method may further include defining an SoE at a time point at which the vehicle is transitioned into series EV driving from EV driving using the terrain driving method as the boundary point A.

In some embodiments, the method may further include, when the SoE is equal to or greater than the boundary point A or the accumulated driving energy is less than the boundary point A', selecting the terrain driving method as a first control period, and controlling the vehicle to be driven in an EV mode in response to the first control period.

In some embodiments, the method may further include defining at least one of a boundary point B based on the SoE to be available based on a current SoC and a voltage depending on the terrain driving method or a boundary point B' based on the accumulated driving energy, wherein the boundary point B is less than the boundary point A and the boundary point B' is greater than the boundary point A'.

In some embodiments, the determining the terrain driving method may include re-calculating the accumulated driving energy from the beginning, when the SoE is equal to or greater than the boundary point B or the re-calculated accumulated driving energy is less than the boundary point B', selecting the terrain driving method as a second control period, and controlling the vehicle to be driven in a series EV mode in response to the second control period.

In some embodiments, the determining the terrain driving method may include, when the SoE is less than the boundary point B or the re-calculated accumulated driving energy is greater than the boundary point B', selecting the terrain driving method as a third control period, and changing the demand torque in response to the third control period to reduce demand torque and electric load of the vehicle.

In some embodiments, the determining the terrain driving method may include determining whether the vehicle escapes from a hard road based on a speed of four wheels of the vehicle and speed of the vehicle.

In another aspect of the present disclosure, a terrain driving mode control apparatus of a hybrid vehicle includes a terrain demand torque determiner configured to define demand torque required for vehicle driving depending on driver demand and an environment of a driving road, a demand torque differentiation determiner configured to differentiate demand torque in response to a terrain driving mode, an accumulated energy calculator configured to calculate accumulated driving energy from a time point of an operation in the terrain driving mode based on the differentiated demand torque, and an electric/hybrid electric vehicle (EV/HEV) driving mode determiner configured to determine a terrain driving method based on the calculated accumulated driving energy and a state of energy (SoE) in consideration of a state of charge (SoC) and a voltage condition of a battery cell.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Reference will now be made in detail to the exemplary embodiments of the present disclosure, examples of which are illustrated in the accompanying drawings. The suffixes "module" and "unit" of elements herein are used for convenience of description and thus can be used interchangeably and do not have any distinguishable meanings or functions.

In the description of exemplary embodiments, it will be understood that, when an element is referred to as being "on", "under", "before" or "after" another element, the element can be directly on the other element, or intervening elements may be present.

It will be understood that, although the terms "first", "second", "A", "B", "(a)", "(b)", etc. may be used herein to describe various elements of the present disclosure, these terms are only used to distinguish one element from another element, and the essential order or sequence of corresponding elements is not limited by these terms. It will be understood that when one element is referred to as being "connected to", "coupled to", or "accessing" another element, the one element may be "connected to" or "coupled to" or "access" the other element via a further element, or the one element may be directly connected to or directly access another element.

The terms "comprises", "includes", and "has" described herein should be interpreted not to exclude other elements but to further include such other elements since the corresponding elements may be included unless specifically mentioned otherwise. All terms including technical or scientific terms have the same meanings as those generally understood by a person having ordinary skill in the art to which the present disclosure pertains unless mentioned otherwise. Generally used terms, such as terms defined in a dictionary, should be interpreted to coincide with meanings of the related art from the context. Unless differently defined in the present disclosure, such terms should not be interpreted in an ideal or excessively formal manner.

Figure 1:
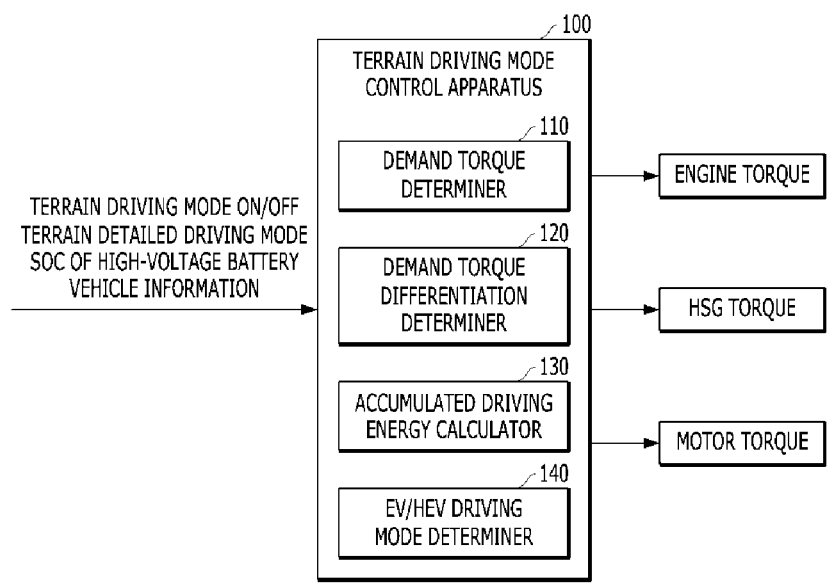
FIG. 1 is a block diagram showing the configuration of a terrain driving mode control apparatus according to an embodiment of the present disclosure.

FIG. 1 is a block diagram showing the configuration of a terrain driving mode control apparatus 100 according to an embodiment of the present disclosure.

Referring to FIG. 1, the terrain driving mode control apparatus 100 may include a demand torque determiner 110, a demand torque differentiation determiner 120, an accumulated driving energy calculator 130, and an electric/hybrid electric vehicle (EV/HEV) driving mode determiner 140.

The terrain driving mode control apparatus 100 may perform state of charge (SoC) balancing control of an optimum high-voltage battery depending on a driving method based on information on a terrain driving mode and a terrain detailed driving mode, SoC information of a high-voltage battery, sensor information of a vehicle, or the like, and may control engine torque, HSG torque, and motor torque of a vehicle.

The demand torque determiner 110 may determine demand torque that is required for vehicle driving depending on driver demand and an environment of a driving road. The demand torque may be determined by an APS opening degree and vehicle speed according to Equation 1 below.

$$T_{Dmd\_Drvier} = f(aps, vs) \qquad \text{[Equation 1]}$$

In this case, $T_{Dmd\_Driver}$ may be driving torque required for vehicle driving, aps may be an APS opening degree, and vs may be vehicle speed.

Then, the demand torque determiner 110 may determine demand torque according to Equation 2 below in consideration of corrected torque obtained by correcting the calculated demand torque depending on a driving road environment (a road gradient, an outdoor temperature, or the like).

$$T_{Dmd\_Nomal} = T_{Dmd\_Driver} * T_{factor\_Env} \qquad \text{[Equation 2]}$$

In this case, $T_{Dmd\_Normal}$ may be demand torque in a normal state of a vehicle, $T_{Dmd\_Driver}$ may be driving torque, and $T_{factor\_Env}$ may be corrected torque depending on a driving road environment.

The demand torque differentiation determiner 120 may apply a profile of driving torque for an escape from a hard road in a terrain driving mode as a profile that is changed depending on topography.

In some embodiments, when terrain driving topography corresponds to snow, the demand torque differentiation determiner 120 may be operated in a snow mode as the terrain driving mode. In this case, the demand torque differentiation determiner 120 may reduce demand torque when a vehicle starts or may determine the demand torque to be similar to normal driving torque in the case of presence of vehicle speed.

In some embodiments, when the terrain driving topography is sand, the demand torque differentiation determiner 120 may be operated in a scan mode as the terrain driving mode. In this case, the demand torque differentiation determiner 120 may determine demand torque and responsiveness when a vehicle starts to be controlled to be reduced.

In some embodiments, when the terrain driving topography is mud, the demand torque differentiation determiner 120 may be operated in a mud/ruts mode as the terrain driving mode. In this case, the demand torque differentiation determiner 120 may determine demand torque and responsiveness when a vehicle starts to be controlled to be increased.

Thus, the demand torque differentiation determiner 120 may calculate demand torque depending on a terrain driving mode and may generate a torque command in consideration of topography according to Equation 3 below.

$$T_{Dmd} = T_{Dmd\_Nomal} * T_{factor\text{-}terrain} \qquad \text{[Equation 3]}$$

In this case, $T_{Dmd}$ may be demand torque depending on a terrain driving mode, $T_{Dmd\_Normal}$ may be demand torque in a normal state of a vehicle, and $T_{factor\_terrain}$ may be corrected torque depending on the terrain driving mode.

The accumulated driving energy calculator 130 may accumulate demand torque depending on a terrain driving mode from a time point of entry into the terrain driving mode to calculate accumulated driving energy according to Equation 4 below.

$$E_{terrain} = \int_0^{inf} T_{Dmd} dt \qquad \text{[Equation 4]}$$

In this case, $E_{terrain}$ may be accumulated driving energy and $T_{Dmd}$ may be demand torque depending on a terrain driving mode.

The EV/HEV driving mode determiner 140 may determine a terrain driving method based on a state of energy (SoE) in consideration of SoC and accumulated driving energy, and a voltage condition of a battery cell, received from the accumulated driving energy calculator 130.

To this end, the EV/HEV driving mode determiner 140 may define a boundary based on accumulated driving energy in consideration of the state of a vehicle system with respect to driving energy consumed during a specific time in a terrain driving mode. The boundary will be described in detail with reference to FIG. 2.

The EV/HEV driving mode determiner 140 may select one of a first control period, a second control period, a third control period, and a fourth control period of a driving method according to a terrain driving mode based on accumulated driving energy and SoE.

The EV/HEV driving mode determiner 140 may execute the first control period to drive a vehicle in an EV mode when a state of energy (SoE) in consideration of an SoC and a voltage condition of a battery cell is equal to or greater than a boundary point A and accumulated driving energy that is accumulated from a time point of an operation in an terrain driving mode is less a boundary point A'.

The EV/HEV driving mode determiner 140 may re-calculate accumulated driving energy from the beginning, and when the SoE is equal to or greater than a boundary point B or the re-calculated accumulated driving energy is less than the boundary point B', the EV/HEV driving mode determiner 140 may execute the second control period to drive a vehicle in an EV mode.

In some embodiments, when a vehicle is confined in a hard road and is not capable of being driven, engine stall occurs due to a speed difference between an engine and a motor in the case of engine clutch engagement in a TMED system, and thus the engine clutch is not capable of being engaged. That is, when it is not possible to transfer driving force of an engine through a transmission, control for transferring driving force using a driving motor connected directly to the transmission may be performed using energy charged using a motor connected directly to the engine.

To this end, vehicular engine control may be performed to optimize fuel efficiency through partial load control. In some embodiments, the partial load control may be performed to comply with an air fuel ratio of 14.6:1.

A vehicular HSG may be controlled to prevent an SoC of a high-voltage battery from being lowered by increasing an SoC of a HSG in order to prevent overcharge when SoC torque and SoC depending on an SoC of a high-voltage battery and demand torque of a driver are low.

Thus, the EV/HEV driving mode determiner 140 may control a vehicular motor to satisfy demand torque that is the sum of engine friction torque and charged HSG torque.

Accordingly, the EV/HEV driving mode determiner 140 may perform an SoC defense strategy by changing an HEV driving mode through control of the second control period. That is, the defense strategy in the second control period may increase engine torque, may convert engine excess torque into energy of a generator using an HSG connected to an engine, may charge a high-voltage battery with the converted energy, and may use the charged energy as driving power of a motor, thereby minimizing SoC discharge.

The EV/HEV driving mode determiner 140 may re-calculate the accumulated driving energy from the beginning, and when the SoE is less than a boundary point B or the re-calculated accumulated driving energy is greater than the boundary point B', the EV/HEV driving mode determiner 140 may execute the third control period for reducing demand torque. That is, when the accumulated driving energy is greater than the boundary point B, the EV/HEV driving mode determiner 140 may execute the third control period that has higher demand for system protection than driver demand to maintain vehicle driving in consideration of the vehicle system.

When an SoC of a hybrid vehicle is excessively low and adversely affects driving performance and it is difficult to endure entire electric load, the EV/HEV driving mode determiner 140 may execute the third control period for reducing demand torque to be used based on an SoE to recover an SoC not to enter such a situation. That is, the EV/HEV driving mode determiner 140 may control a vehicle to be driven in an HEV mode through the third control period and may perform SoC defense.

Thus, the EV/HEV driving mode determiner 140 may perform an SoC defense strategy by changing an HEV driving mode through control of the third control period. That is, the defense strategy in the third control period may reduce demand torque of a driver to protect the vehicle system.

When speed difference $Diff_{slip}$ of four wheels of the vehicle is equal to or less than a specific value and a vehicle speed is equal to or greater than a specific value, the EV/HEV driving mode determiner 140 may determine the vehicle to escape from a hard road and may execute a fourth control period to drive the vehicle in a normal HEV.

Thus, when checking whether the vehicle escapes from the hard road, the EV/HEV driving mode determiner 140 may convert driving torque control into normal control and may execute the fourth control period.

Figure 2:
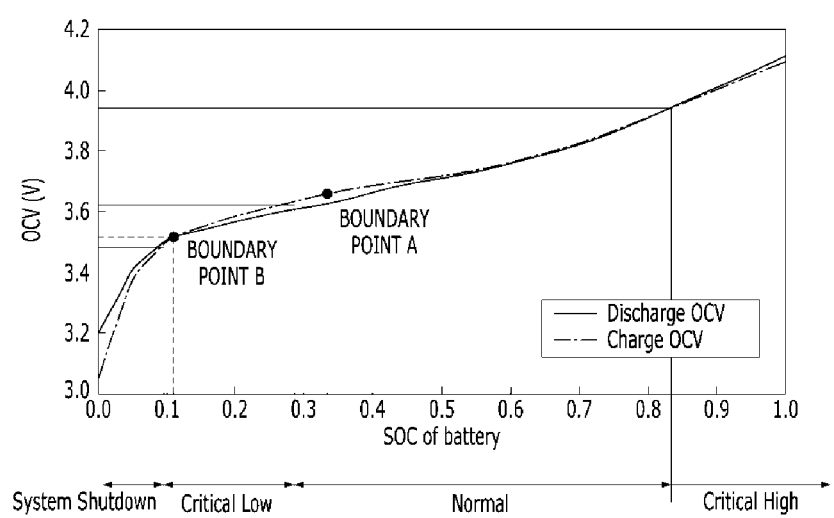
FIG. 2 is a diagram illustrating an example of a boundary point depending on a state of energy (SoE) according to an embodiment of the present disclosure.

FIG. 2 is a diagram illustrating an example of a boundary point depending on an SoE according to an embodiment of the present disclosure.

In a graph of FIG. 2, the horizontal axis is an SoC of a battery SOC and the vertical axis is an open circuit voltage (OCV) of the battery.

FIG. 2 shows a boundary point A and a boundary point B in a state of energy (SoE) in consideration of SoC and a voltage condition of a battery cell for SoC balancing of a vehicle.

In this case, the SoE may be available battery energy and may be defined according to Equation 5 below.

$$SOE = \frac{E_{rem}}{E_{max}} * 100\%$$ [Equation 5]

$$E_{rem} = Q_{rem} U_{ocv|soc} = [0\%, SOC],$$

$$E_{max} = Q_{max} U_{ocv|soc} = [0\%, 100\%]$$

The boundary point A may correspond to a region 'Normal SoC' required in the case of hybrid driving and may be a setting reference of an SoC that is required for engine driving in order to prevent SoC discharge of a vehicle.

In this case, the boundary point A may be set to an SoE at a time point at which the vehicle is transitioned into series EV driving from EV driving. That is, the boundary point A may be defined according to {available battery energy amount=(Current SoE−SoE required for transition into series EV from EV)*high-voltage battery capacity (Kwh)}.

The boundary point B may correspond to a region 'Critical Low' and a corresponding SoC reference may be a setting reference of an SoC that is required to prevent adversely influence on a vehicle system, such as an air conditioner or an SoC of an auxiliary battery, used using a high-voltage battery, to prevent degradation of driving performance, and to protect a system when energy of the high-voltage battery is insufficient both in a hybrid vehicle (HEV) and a plug-in hybrid vehicle (PHEV).

In this case, the boundary point B may defined by calculating available SoE based on the current SoC and voltage. That is, the boundary point B may be defined according to {Available battery energy amount=(Current SoE−SoE required for EV2SeriesEV transition)*high-voltage battery capacity (Kwh)}.

Figure 3:
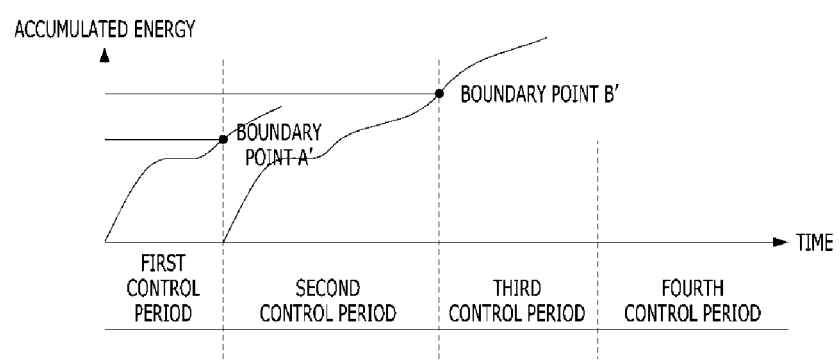
FIGS. 3 and 4 show a driving mode depending on a terrain driving mode of a hybrid vehicle according to an embodiment of the present disclosure.
Figure 4:
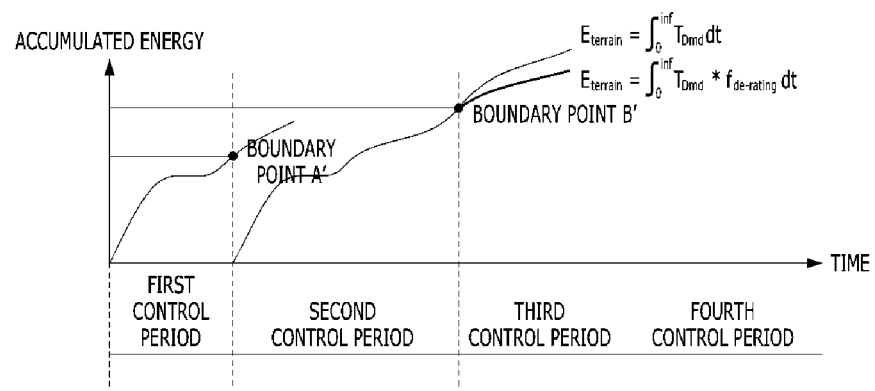

FIGS. 3 and 4 show a driving mode depending on a terrain driving mode of a hybrid vehicle according to an embodiment of the present disclosure.

In graphs shown in FIGS. 3 and 4, the horizontal axis is a time and the vertical axis is accumulated driving energy.

Referring to FIGS. 3 and 4, the boundary point A' and the boundary point B' may be defined in consideration of the state of a vehicle system with respect to driving energy consumed for a specific time in the terrain driving mode.

In this case, as shown in FIG. 2, the boundary points A and B may be set based on an SoE of a battery, accumulated driving energy values may be calculated based on the set boundary points A and B, and the boundary points A' and B' for a reference of the accumulated driving energy may be set.

When the boundary points A and B based on the SoE is calculated as the boundary points A' and B' for a reference of the accumulated driving energy, the calculated value may be changed in consideration of at least one of a road environment, a driving habit, or battery charge and discharge characteristics.

As shown in FIG. 3, when accumulated driving energy that is accumulated from a time point of an operation in an terrain driving mode is less than the boundary point A', a vehicle may be controlled in the first control period of the driving method. Thus, when a time point of entry into the terrain driving mode is higher than the boundary point A based on an SoE, the vehicle may calculate available energy based on the remaining SoE and may execute the EV driving mode based on the calculated available energy. In this case, the EV driving mode may be a driving mode that satisfies demand torque of a driver by an electric motor.

The vehicle may re-calculate accumulated driving energy from the beginning, and when the SoE is equal to or greater than the boundary point B or the re-calculated accumulated driving energy is less than the boundary point B', the vehicle may be controlled in the second control period of the driving method.

Thus, when a time point of entry into a terrain driving mode is lower than the boundary point A based on an SoE, the vehicle may immediately enter the second control period and may execute the series EV driving mode. In this case, the series EV driving mode may be a driving mode that has the same driving strategy as an EV mode but may be a driving mode in which an engine is driven to perform charge with excess energy of the engine using an HSG and to increase available EV energy.

As shown in FIG. 4, the accumulated driving energy may be re-calculated from the beginning, and when the SoE is less than the boundary point B or the re-calculated accumulated driving energy is greater than the boundary point B', control may be performed in the third control period of the driving method.

Thus, the vehicle may change driver demand torque in response to the third control period. Thus, the driver demand torque may be reduced, and the reduced torque amount $f_{de-rating}$ of the demand torque may be defined according to a function with respect to electric consumption power that uses the remaining SoC and a high-voltage battery. The remaining SoC may be margin between the current SoC and an SoC that causes system shutdown and the electric load may be consumption power to be available through a high-voltage battery. Thus, when the electric load is high, the SoE may be more rapidly consumed.

Thus, an accumulated energy amount in the third control period may be calculated according to Equation 6 below.

$$E_{terrain} = \int_0^{inf} T_{Dmd} * f_{de-rating} dt \qquad [\text{Equation 6}]$$

In this case, $E_{terrain}$ may be accumulated driving energy, and $T_{Dmd}$ may be demand torque depending on a terrain driving mode.

Figure 5:
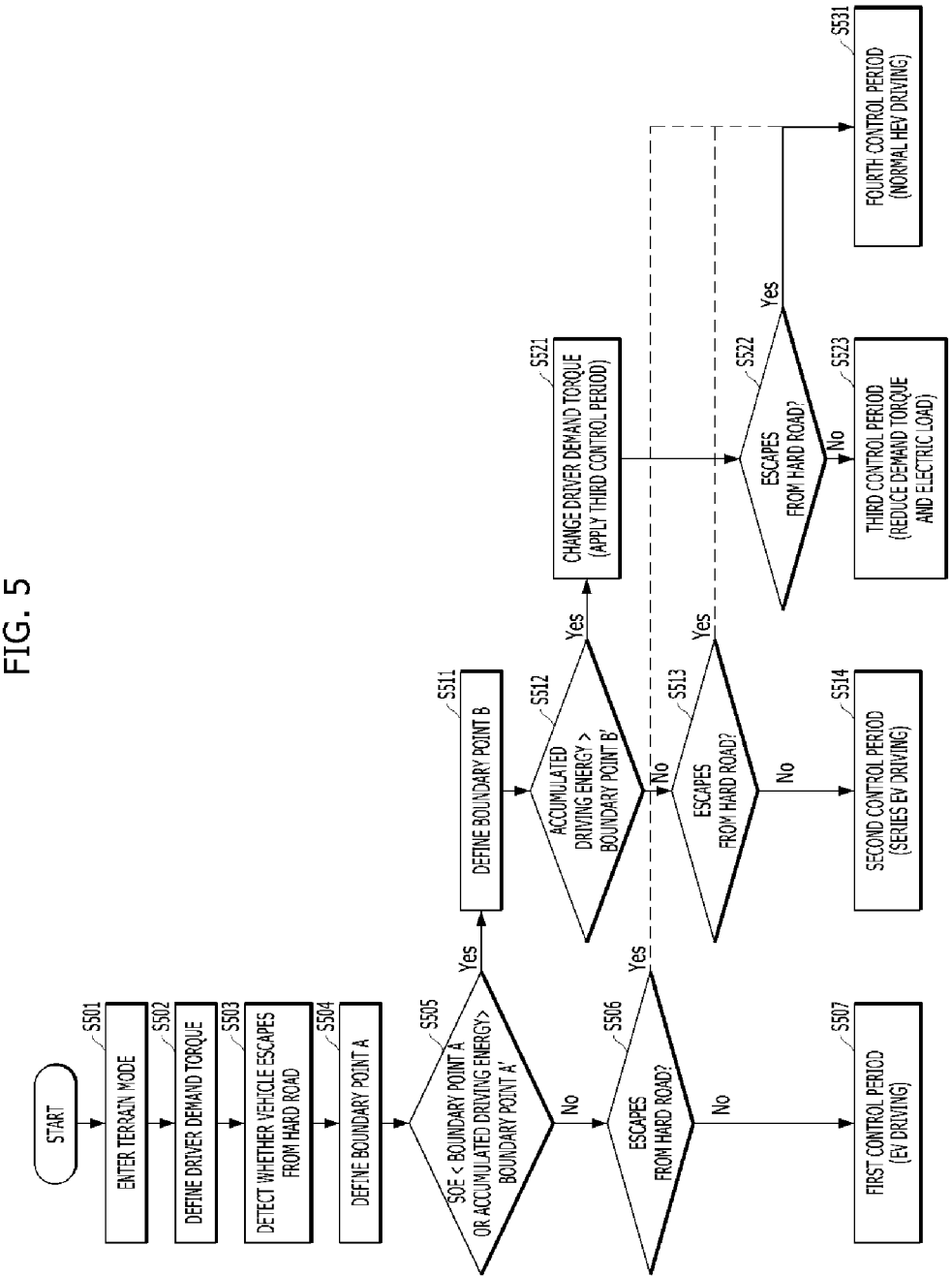
FIG. 5 is a flowchart of a method of controlling a terrain driving mode according to an embodiment of the present disclosure.

FIG. 5 is a flowchart of a method of controlling a terrain driving mode according to an embodiment of the present disclosure.

Referring to FIG. 5, when a vehicle enters a terrain driving mode (S501), the terrain driving mode control apparatus 100 may define demand torque (S502).

In some embodiments, demand torque $T_{Dmd\_Normal}$ in the case of normal driving may be driving torque $T_{Dmd\_Driver}$ depending on driving road environment of corrected torque $T_{factor\_Env}$.

In some embodiments, demand torque $T_{Dmd}$ in the case of entry into a terrain driving mode may be driving torque $T_{factor\ terrain}$ for an escape from a hard road of demand torque $T_{Dmd\_Normal}$ in the case of normal driving}.

In some embodiments, demand torque $T_{Dmd}$ in the case of entry into the third control period may be {the reduced torque amount-de-rating f of an the demand torque of driving torque $T_{factor\ terrain}$ for an escape from a hard road of demand torque $T_{Dmd\_Normal}$ in the case of normal driving}.

After operation S502, the terrain driving mode control apparatus 100 may detect whether the vehicle escapes from a hard road (S503). In this case, when speed difference $\text{Diff}_{slip}$ of four wheels of the vehicle is equal to or less than a specific value and a vehicle speed is equal to or greater than a specific value, the terrain driving mode control apparatus 100 may determine the vehicle to escape from a hard road.

After operation S503, the terrain driving mode control apparatus 100 may define the boundary point A based on an SoE in consideration of an SoC and a voltage condition of a battery cell and may define the boundary point A' of the accumulated driving energy from a time point of entry into the terrain driving mode based on the boundary point A (S504).

After operation S504, the terrain driving mode control apparatus 100 may determine whether the SOE is less than the boundary point A or the accumulated driving energy is greater than the boundary point A' (S505).

After operation S505, when the accumulated driving energy is less the boundary point A' and a state of energy (SoE) in consideration of an SoC and a voltage condition of a battery cell is equal to or greater than the boundary point A (NO of S505), the terrain driving mode control apparatus 100 may detect whether the vehicle escapes from a hard road (S506).

After operation S506, as the detection result, when the vehicle is not capable of escaping from the hard road (NO of S506), the terrain driving mode control apparatus 100 may select the first control period of the driving method in the terrain driving mode and may control the vehicle to be driven in an EV mode (S507).

After operation S506, as the detection result, when the vehicle escapes from the hard road (YES of S506), the terrain driving mode control apparatus 100 may select the fourth control period of the driving method in the terrain driving mode and may control the vehicle to be driven in a normal HEV mode (S531).

After operation S505, when the SoE is equal to or greater than the boundary point A or the accumulated driving energy is less than the boundary point A' (YES of S505), the terrain driving mode control apparatus 100 may define the boundary point B based on an SoE in consideration of an SoC and a voltage condition of a battery cell and may define the boundary point B' of the accumulated driving energy based on the boundary point B (S511).

After operation S511, the terrain driving mode control apparatus 100 may determine whether the SoE is less than the boundary point B or the re-calculated accumulated driving energy is greater than the boundary point B' (S512).

After operation S512, when the SoE is equal to or greater than the boundary point B or the re-calculated accumulated driving energy is less than the boundary point B' (NO of S512), the terrain driving mode control apparatus 100 may detect whether the vehicle escapes from the hard road (S513).

After operation S513, as the detection result, when the vehicle is not capable of escaping from the hard road (NO of S513), the terrain driving mode control apparatus 100 may select the second control period of the driving method in the terrain driving mode and may control the vehicle to be driven in a series EV mode (S514).

After operation S513, as the detection result, when the vehicle escapes from the hard road (YES of S513), the terrain driving mode control apparatus 100 may select the fourth control period of the driving method in the terrain driving mode and control the vehicle to be driven in a normal HEV mode (S531).

After operation S512, when the SOE is less than the boundary point B or the re-calculated accumulated driving energy is greater than the boundary point B' (YES of S512), the terrain driving mode control apparatus 100 may change driver demand torque (S521). In this case, the changed driver demand torque may be torque corresponding to the third control period.

After operation S521, the terrain driving mode control apparatus 100 may detect whether the vehicle escapes from the hard road (S522).

After operation S522, as the detection result, when the vehicle escapes from the hard road (NO of S522), the terrain driving mode control apparatus 100 may select the third control period of the driving method in the terrain driving mode and may perform control to reduce demand torque and electric load of the vehicle (S523).

After operation S522, as the detection result, when the vehicle escapes from the hard road (YES of S522), the terrain driving mode control apparatus 100 may select the fourth control period of the driving method in the terrain driving mode and may control the vehicle to be driven in a normal HEV mode (S531).

A method and apparatus for controlling a terrain driving mode of a hybrid vehicle according to the present disclosure may advantageously minimize entry into a battery charge mode through control of a terrain driving mode of a battery to enhance fuel efficiency and to maintain performance.

It will be appreciated by persons skilled in the art that that the effects that could be achieved with the present disclosure are not limited to what has been particularly described hereinabove and other advantages of the present disclosure will be more clearly understood from the detailed description.

The aforementioned method according to embodiments may also be embodied as computer readable code on a computer readable recording medium. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion. Also, functional programs, code, and code segments for accomplishing the present disclosure may be easily construed by programmers skilled in the art to which the present disclosure pertains.

What is claimed is:

1. A method of controlling a terrain driving mode of a hybrid vehicle, the method comprising:
    defining demand torque required for vehicle driving depending on driver demand and an environment of a driving road;
    differentiating demand torque in response to the terrain driving mode;
    calculating accumulated driving energy from a time point of an operation in the terrain driving mode based on the differentiated demand torque; and
    determining a terrain driving method based on the calculated accumulated driving energy and a state of energy (SoE) in consideration of a state of charge (SoC) and a voltage condition of a battery cell.

2. The method of claim 1, wherein the determining the terrain driving method includes:
    defining at least one of a boundary point A based on the SoE or a boundary point A' based on the accumulated driving energy; and
    determining whether the SoE is less than the boundary point A or the accumulated driving energy is greater than the boundary point A'.

3. The method of claim 2, wherein the defining a reference boundary point of the accumulated driving energy includes defining a boundary point based on the accumulated driving energy in consideration of at least one of road environment, a driving habit, or battery charge and discharge characteristics.

4. The method of claim 2, further comprising:
    defining an SoE at a time point at which the vehicle is transitioned into series EV driving from EV driving using the terrain driving method as the boundary point A.

5. The method of claim 4, further comprising:
    when the SoE is equal to or greater than the boundary point A or the accumulated driving energy is less than the boundary point A', selecting the terrain driving method as a first control period; and
    controlling the vehicle to be driven in an EV mode in response to the first control period.

6. The method of claim 5, further comprising:
    defining at least one of a boundary point B based on the SoE to be available based on a current SoC and a voltage depending on the terrain driving method or a boundary point B' based on the accumulated driving energy,
    wherein the boundary point B is less than the boundary point A and the boundary point B' is greater than the boundary point A'.

7. The method of claim 6, wherein the determining the terrain driving method includes:
   re-calculating the accumulated driving energy from the beginning;
   when the SoE is equal to or greater than the boundary point B or the re-calculated accumulated driving energy is less than the boundary point B', selecting the terrain driving method as a second control period; and
   controlling the vehicle to be driven in a series EV mode in response to the second control period.

8. The method of claim 6, wherein the determining the terrain driving method includes:
   when the SoE is less than the boundary point B or the re-calculated accumulated driving energy is greater than the boundary point B', selecting the terrain driving method as a third control period; and
   changing the demand torque in response to the third control period to reduce demand torque and electric load of the vehicle.

9. The method of claim 1, wherein the determining the terrain driving method includes determining whether the vehicle escapes from a hard road based on a speed of four wheels of the vehicle and speed of the vehicle.

10. A computer-readable recording medium having recorded thereon a program for executing the method of claim 1.

11. A terrain driving mode control apparatus of a hybrid vehicle, comprising:
   a terrain demand torque determiner configured to define demand torque required for vehicle driving depending on driver demand and an environment of a driving road;
   a demand torque differentiation determiner configured to differentiate demand torque in response to a terrain driving mode;
   an accumulated energy calculator configured to calculate accumulated driving energy from a time point of an operation in the terrain driving mode based on the differentiated demand torque; and
   an electric/hybrid electric vehicle (EV/HEV) driving mode determiner configured to determine a terrain driving method based on the calculated accumulated driving energy and a state of energy (SoE) in consideration of a state of charge (SoC) and a voltage condition of a battery cell.

12. The terrain driving mode control apparatus of claim 11, wherein the EV/HEV driving mode determiner defines at least one of a boundary point A based on the SoE or a boundary point A' based on the accumulated driving energy, and determines whether the SoE is less than the boundary point A or the accumulated driving energy is greater than the boundary point A'.

13. The terrain driving mode control apparatus of claim 12, wherein the EV/HEV driving mode determiner defines a boundary point based on the accumulated driving energy in consideration of at least one of road environment, a driving habit, or battery charge and discharge characteristics.

14. The terrain driving mode control apparatus of claim 12, wherein the EV/HEV driving mode determiner defines an SoE at a time point at which the vehicle is transitioned into series EV driving from EV driving using the terrain driving method as the boundary point A.

15. The terrain driving mode control apparatus of claim 14, wherein, when the SoE is equal to or greater than the boundary point A or the accumulated driving energy is less than the boundary point A', the EV/HEV driving mode determiner selects the terrain driving method as a first control period and controls the vehicle to be driven in an EV mode in response to the first control period.

16. The terrain driving mode control apparatus of claim 15, wherein the EV/HEV driving mode determiner defines at least one of a boundary point B based on the SoE to be available based on a current SoC and a voltage depending on the terrain driving method or a boundary point B' based on the accumulated driving energy; and
   wherein the boundary point B is less than the boundary point A and the boundary point B' is greater than the boundary point A'.

17. The terrain driving mode control apparatus of claim 16, wherein the EV/HEV driving mode determiner re-calculates the accumulated driving energy from the beginning, selects the terrain driving method as a second control period when the SoE is equal to or greater than the boundary point B or the re-calculated accumulated driving energy is less than the boundary point B', and controls the vehicle to be driven in a series EV mode in response to the second control period.

18. The terrain driving mode control apparatus of claim 16, wherein, when the SoE is less than the boundary point B or the re-calculated accumulated driving energy is greater than the boundary point B', the EV/HEV driving mode determiner selects the terrain driving method as a third control period, and changes the demand torque in response to the third control period to reduce demand torque and electric load of the vehicle.

19. The terrain driving mode control apparatus of claim 11, wherein the EV/HEV driving mode determiner determines whether the vehicle escapes from a hard road based on a speed of four wheels of the vehicle and speed of the vehicle.

* * * * *